US010035868B2

(12) United States Patent
Pannell et al.

(10) Patent No.: US 10,035,868 B2
(45) Date of Patent: Jul. 31, 2018

(54) CONTINUITY COMPOSITIONS AND METHODS OF MAKING AND USING THE SAME

(71) Applicant: Univation Technologies, LLC, Houston, TX (US)

(72) Inventors: Richard B. Pannell, Kingwood, TX (US); David M. Glowczwski, Baytown, TX (US); Chi-I Kuo, Humble, TX (US); Timothy R. Lynn, Middlesex, NJ (US); Fathi David Hussein, Hilton Head Island, SC (US); Phuong A. Cao, Old Bridge, NJ (US); Wesley R. Mariott, Freeport, TX (US); Michael D. Awe, Middlesex, NJ (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 15/586,680

(22) Filed: May 4, 2017

(65) Prior Publication Data

US 2017/0240674 A1 Aug. 24, 2017

Related U.S. Application Data

(62) Division of application No. 15/301,137, filed as application No. PCT/US2015/019679 on Mar. 10, 2015, now Pat. No. 9,676,885.

(60) Provisional application No. 61/974,032, filed on Apr. 2, 2014.

(51) Int. Cl.
*C08F 2/00* (2006.01)
*C08F 4/00* (2006.01)
*C08F 210/16* (2006.01)

(52) U.S. Cl.
CPC ........ *C08F 210/16* (2013.01); *C08F 2410/01* (2013.01)

(58) Field of Classification Search
CPC ............... C08F 210/16; C08F 4/65912; C08F 4/65916; C08F 4/65925; C08F 4/65927; C08F 2410/02; B01J 31/0202; B01J 31/0237
USPC ............................................. 526/74, 89, 90
See application file for complete search history.

(56) References Cited

U.S. PATENT DOCUMENTS

2011/0288248 A1* 11/2011 Gao .................. C08F 10/00
526/114
2011/0288428 A1   11/2011 Gao et al.

FOREIGN PATENT DOCUMENTS

| EP | 2610269 | 7/2013 |
|---|---|---|
| WO | 00/02930 | 1/2000 |
| WO | 02/50133 | 6/2002 |
| WO | 2012/041811 | 4/2012 |
| WO | 2012/074709 | 6/2012 |

OTHER PUBLICATIONS

Literature from Aviar Company on Zinc Stearate AS 990-2 or Kenmamide AS 990-2, printed on Nov. 21, 2017.*
International Search Report & Written Opinion for related PCT Application PCT/US2015/019679, dated May 21, 2015 (11 pgs).
International Preliminary Report on Patentability for related PCT Application PCT/US2015/019679, dated Oct. 13, 2016 (6 pgs).

* cited by examiner

*Primary Examiner* — William Cheung
(74) *Attorney, Agent, or Firm* — Brooks, Cameron & Huebsch, PLLC

(57) ABSTRACT

Continuity compositions are provided as are methods of their preparation. The compositions comprise metal carboxylate salts and fatty amines and find advantageous use in olefin polymerization processes.

19 Claims, No Drawings

CONTINUITY COMPOSITIONS AND METHODS OF MAKING AND USING THE SAME

This application is a Divisional Application of U.S. National Stage Application Number 15/301,137, filed Sep. 30, 2016 and published as U.S. Publication No. 2017/0022310 A1 on Jan. 26, 2017, now U.S. Pat. No. 9,676,885, which claims the benefit of International Application Number PCT/US2015/019679, filed Mar. 10, 2015 and published as WO 2015/153082 on Oct. 8, 2015, which claims the benefit to U.S. Provisional Application 61/974,032, filed Apr. 2, 2014, the entire contents of which are incorporated herein by reference in its entirety.

BACKGROUND

A major focus of the polyolefin industry in recent years has been on the development of new catalysts that deliver new and improved products. In this regard, metallocene catalysts, for example, are now widely used to produce polyolefin polymers, such as polyethylene polymers. While there are many advantages to using metallocene catalysts in olefin polymerization, there remain significant challenges. For example, metallocene catalysts, in particular supported metallocene catalysts, may be more prone to causing reactor fouling which may cause disruption and premature shutdown of the reactor. This is particularly the case in particle forming processes, such as gas and slurry phase processes. Adding other reagents to the polymerization process, such as antifouling agents or continuity additives/aids or continuity compositions, have been used to address such fouling issues.

In order to address reactor fouling problems caused by high activity metallocene catalysts, additives such as metal carboxylate salts may be added to the process, either separately or as part of the supported catalyst composition, such as in U.S. Pat. Nos. 6,608,153, 6,300,436 and 5,283,278.

U.S. Pat. Appln. Pubn. No. 2010/0292418 discloses a process for producing olefin based polymers in the presence of a continuity composition comprising an aluminum carboxylate and a fatty amine alkoxylate. The composition is prepared by mixing, for example, solid aluminum distearate and solid ethoxylated stearyl amine in mineral oil. The particular ethoxylated stearyl amine utilized is a commercially available form designated as AS-990, which contains ethoxylated stearyl amine and particulate silica.

However, components employed to address reactor fouling, such as the above mentioned metal carboxylate salts and/or fatty amines, often present handing difficulties. For example continuity compositions based on such components may be time consuming to prepare and often show inconsistent behavior. Mixing solid components, even under slurry conditions, can result in the formation of agglomerates which may adversely affect flowability and make the solid or slurry difficult to dry to the low moisture levels desirable for olefin polymerization. The use of higher temperature drying can be detrimental as this may cause the viscosity of a slurry derived from solid components to significantly increase, possibly through gelling mechanisms, making the slurry difficult to handle.

Therefore, despite the various continuity compositions known, challenges remain. Thus, it would be desirable to provide continuity compositions useful in olefin polymerization that are advantageous to prepare and handle and are also capable of operating in a polymerization process continuously with enhanced reactor operability.

SUMMARY

In a first aspect there is provided a continuity composition comprising at least one metal carboxylate salt wherein said metal carboxylate salt is modified with at least one molten fatty amine.

The continuity composition may further comprise at least one liquid vehicle. Non-limiting examples of liquid vehicles include mineral oils, aromatic hydrocarbons or aliphatic hydrocarbons.

The at least one fatty amine may be represented by the formula:

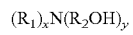
$(R_1)_x N(R_2OH)_y$ wherein
$R_1$ is a hydrocarbyl radical having from 9 to 40 carbon atoms;
$R_2$ is a hydrocarbyl radical having from 1 to 8 carbon atoms;
and
x has a value of 1 or 2 and $x+y=3$.

$R_1$ may be a hydrocarbyl radical having from 14 to 26 carbon atoms. $R_2$ may be methyl, ethyl, n-propyl, n-butyl or iso-propyl.

The at least one metal carboxylate salt may be represented by the formula:

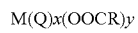
$M(Q)_x(OOCR)_y$ where M is a metal from Group 3 to 16 and the Lanthanide and Actinide series, Q is halogen, hydrogen, a hydroxy or hydroxide, alkyl, alkoxy, aryloxy, siloxy, silane or sulfonate group, R is a hydrocarbyl radical having from 1 to 100 carbon atoms; and x is an integer from 0 to 3 and y is an integer from 1 to 4 and the sum of x and y is equal to the valence of the metal.

The at least one metal carboxylate salt may also be represented by the formula:

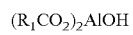
$(R_1CO_2)_2AlOH$ wherein $R_1$ is a hydrocarbyl radical containing from 12 to 30 carbon atoms.

The at least one metal carboxylate salt may comprise an aluminum carboxylate. Additionally, the metal carboxylate salt may comprise an aluminum mono-stearate, an aluminum di-stearate, an aluminum tri-stearate, or a combination thereof.

When a liquid vehicle is present, the continuity composition may comprise at least one fatty amine in an amount greater than or equal to about 0.5%, or 1%, or 2%, or 3%, or 4%, or 5%, or 6%, or 7%, or 8%, or 10%, or 15% by weight, based on the total weight of the continuity composition including liquid vehicle.

When a liquid vehicle is present, the continuity composition may comprise at least one metal carboxylate salt in an amount greater than or equal to about 0.5%, or 1%, or 2%, or 3%, or 4%, or 5%, or 6%, or 7%, or 8%, or 10% or 15% by weight, based on the total weight of the continuity composition including liquid vehicle.

The continuity composition may comprise:
a) 2-20 wt. % of at least one metal carboxylate salt,
b) 2-20 wt. % of at least one fatty amine, and
c) at least one liquid vehicle;
based on the total weight percent of a), b) and c).

The continuity composition may also comprise:
a) 3-15 wt. % of at least one metal carboxylate salt,
b) 3-15 wt. % of at least one fatty amine, and
c) at least one liquid vehicle;
based on the total weight percent of a), b) and c). The continuity composition may also comprise any one of or any combination of the features above.

The at least one fatty amine may further comprise a particulate inorganic oxide. Non limiting examples of particulate inorganic oxides include silica or alumina. The at least one fatty amine may also be free of particulate inorganic oxides. The at least one fatty amine may also be free of silica or alumina. The at least one fatty amine may also be substantially free of particulate inorganic oxides. The at least one fatty amine may also be substantially free of silica or alumina. The terms "substantially free" or "essentially free," when used in this disclosure, mean that the relevant compound comprises less than 1 wt %, less than 0.5 wt %, less than 0.2 wt %, or 0 wt % of the noted material.

The continuity compositions disclosed herein possess advantageous properties. They may be dried to low moisture levels in relatively short periods of time with excellent batch to batch consistency. Metal carboxylate salts which have been contacted with molten fatty amine surprisingly offer continuity compositions which facilitate ease of drying and result in compositions having enhanced flowability and handling qualities. Without wishing to be bound by theory, the molten fatty amine likely favorably interacts with the metal carboxylate salt so as form a coating. The continuity compositions perform well in continuous olefin polymerization processes in terms of catalyst activity and/or process continuity.

Further, modification of metal carboxylates with molten fatty amines presents advantages in moisture removal techniques. For example, the continuity compositions may be dried at higher temperatures, optionally under vacuum, and, further, optionally with the aid of nitrogen purging and/or sparging. This may allow production of continuity compositions of very low moisture content having advantageous application in olefin polymerization processes. Exemplary moisture levels include below 1000 ppm, below 500 ppm, or below 200 ppm. Further, flowability of the continuity compositions is enhanced relative to comparative compositions prepared with non-molten fatty amines.

Also disclosed herein are processes for making the continuity compositions and polymerization processes utilizing the continuity compositions.

Accordingly, there is provided a process for producing a continuity composition, comprising the step of contacting at least one metal carboxylate salt with at least one molten fatty amine. The process may be performed in the presence of one or more liquid vehicles. Non-limiting examples of liquid vehicles include mineral oils, aromatic hydrocarbons or aliphatic hydrocarbons.

The process may comprise adding one or more further metal carboxylate salts to the product of at least one metal carboxylate salt and at least one molten fatty amine.

There is provided a process for producing a continuity composition comprising a step of: combining at least one metal carboxylate salt and at least one molten fatty amine in at least one liquid vehicle, so as to form a slurry of the continuity composition in said liquid vehicle.

There is also provided a process for producing a continuity composition comprising the steps of:
a) combining at least one metal carboxylate salt with at least one liquid vehicle; and
b) adding at least one molten fatty amine to the mixture formed in a) so as to form a slurry of the continuity composition in said liquid vehicle.

The process may further comprise the step of:
drying the slurry formed in step b) until the moisture level is below 1000 ppm, preferably below 500 ppm, more preferably below 200 ppm.

Step a) may be performed at a temperature from between about 20° C. and about 80° C., between about 30° C. and about 70° C., or between about 40° C. and about 65° C.

There is also provided a process for producing a continuity composition comprising the steps of:
a) combining at least one molten fatty amine with at least one liquid vehicle; and
b) adding at least one metal carboxylate salt to the mixture formed in a) so as to form a slurry of the continuity composition in said liquid vehicle.

The process may further comprise the step of:
drying the slurry formed in step b) until the moisture level is below 1000 ppm, preferably below 500 ppm, more preferably below 200 ppm.

In any of the embodiments disclosed herein, the at least one metal carboxylate salt and at least one molten fatty amine may be spray dried or spray congealed. The resulting spray dried powder may be subsequently slurried in a suitable liquid vehicle.

Accordingly, there is also provided a process for producing a continuity composition comprising the steps of:
a) spray drying at least one metal carboxylate salt with at least one molten fatty amine; and
b) adding the spray dried mixture to one or more liquid vehicles.

The process may further comprises the step of contacting the product of step a) and/or step b) with further metal carboxylate salt.

The molten fatty amine may be pre-dried at temperatures above ambient, optionally with the aid of vacuum, and further optionally with the aid of nitrogen purging and/or sparging.

In any of the embodiments disclosed herein, the at least one molten fatty amine may further comprise a particulate inorganic oxide. Non limiting examples of particulate inorganic oxides include silica or alumina. The at least one fatty amine may also be free of particulate inorganic oxides, such as silica or alumina. The at least one fatty amine may also be substantially free of particulate inorganic oxides, such as silica or alumina.

The at least one fatty amine may be represented by the formula:

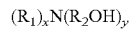
$(R_1)_x N(R_2 OH)_y$ wherein
$R_1$ is a hydrocarbyl radical having from 9 to 40 carbon atoms;
$R_2$ is a hydrocarbyl radical having from 1 to 8 carbon atoms;
and
x has a value of 1 or 2 and x+y=3.

$R_1$ may be a hydrocarbyl radical having from 14 to 26 carbon atoms. $R_2$ may be methyl, ethyl, n-propyl, n-butyl or iso-propyl.

The at least one metal carboxylate salt may be represented by the formula:

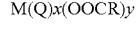
$M(Q)_x(OOCR)_y$ where M is a metal from Group 3 to 16 and the Lanthanide and Actinide series, Q is halogen, hydrogen, a hydroxy or hydroxide, alkyl, alkoxy, aryloxy, siloxy, silane or sulfonate group, R is a hydrocarbyl radical having from 1 to 100 carbon atoms; and x is an integer from 0 to 3 and y is an integer from 1 to 4 and the sum of x and y is equal to the valence of the metal.

The at least one metal carboxylate salt may be represented by the formula:

$$(R_1CO_2)_2AlOH$$

wherein $R_1$ is a hydrocarbyl radical containing from 12 to 30 carbon atoms.

The at least one metal carboxylate salt may also comprise an aluminum carboxylate. For example the metal carboxylate salt may comprise an aluminum mono-stearate, an aluminum di-stearate, an aluminum tri-stearate, or a combination thereof.

There is also provided herein a process for polymerizing olefins comprising contacting olefins with one or more continuity compositions as hereinbefore described.

The process may comprise contacting olefins with one or more catalyst compositions and at least one continuity composition as hereinbefore described in a reactor under polymerization conditions to produce an olefin polymer or copolymer.

The catalyst composition may comprise a support, an activator, and one or more catalyst compounds comprising a titanium, a zirconium, or a hafnium atom.

The catalyst compound may be selected from the group consisting of:
(pentamethylcyclopentadienyl)(propylcyclopentadienyl) $MX_2$,
(tetramethylcyclopentadienyl)(propylcyclopentadienyl) $MX_2$,
(tetramethylcyclopentadienyl)(butylcyclopentadienyl) $MX_2$,
$Me_2Si(indenyl)_2MX_2$,
$Me_2Si(tetrahydroindenyl)_2MX_2$,
(n-propyl cyclopentadienyl)$_2MX_2$,
(n-butyl cyclopentadienyl)$_2MX_2$,
(1-methyl, 3-butyl cyclopentadienyl)$_2MX_2$,
$HN(CH_2CH_2N(2,4,6-Me_3phenyl))_2MX_2$,
$HN(CH_2CH_2N(2,3,4,5,6-Me_5phenyl))_2MX_2$,
(propyl cyclopentadienyl)(tetramethylcyclopentadienyl) $MX_2$,
(butyl cyclopentadienyl)$_2MX_2$,
(propyl cyclopentadienyl)$_2MX_2$, and a combination thereof,
wherein M is Zr or Hf, and X is selected from the group consisting of F, Cl, Br, I, Me, Bnz, $CH_2SiMe_3$, and C1 to C5 alkyls or alkenyls.

DETAILED DESCRIPTION

Before the present compounds, components, compositions, and/or methods are disclosed and described, it is to be understood that unless otherwise indicated this invention is not limited to specific compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified. Thus, for example, reference to "a leaving group" as in a moiety "substituted with a leaving group" includes more than one leaving group, such that the moiety may be substituted with two or more such groups. Similarly, reference to "a halogen atom" as in a moiety "substituted with a halogen atom" includes more than one halogen atom, such that the moiety may be substituted with two or more halogen atoms, reference to "a substituent" includes one or more substituents, reference to "a ligand" includes one or more ligands, and the like.

As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC), unless reference is made to the Previous IUPAC form noted with Roman numerals (also appearing in the same), or unless otherwise noted.

Disclosed herein are continuity compositions for the polymerization of olefins which are advantageous to prepare and use. The continuity compositions are characterized in that they comprise at least one metal carboxylate salt modified by or contacted with at least one molten fatty amine. The continuity compositions may be capable of operating in a polymerization process continuously with enhanced reactor operability. Also disclosed herein are methods of making the continuity compositions and polymerization processes utilizing the continuity compositions for the production of olefin polymers.

Catalysts

Any catalyst or combination of catalysts utilized to polymerize olefins are suitable for use in the polymerizing processes of the present disclosure. The following is a discussion of various catalysts set forth for the purpose of explanation and not limitation.

General Definitions

As used herein, a "catalyst composition" includes one or more catalyst components utilized to polymerize olefins and may also include at least one activator or alternatively, at least one cocatalyst. A catalyst composition may also include other components, for example, supports, and is not limited to the catalyst component and/or activator or cocatalyst alone or in combination. The catalyst composition may include any suitable number of catalyst components in any combination as described herein, as well as any activator or cocatalyst in any combination as described herein. The catalyst composition may also contain one or more components known in the art to reduce or eliminate reactor fouling.

As used herein, a "catalyst compound" may include any compound that, when activated, is capable of catalyzing the polymerization or oligomerization of olefins, wherein the catalyst compound comprises at least one Group 3 to 12 atom, and optionally at least one leaving group bound thereto.

Conventional Catalysts

Conventional catalysts are those traditional Ziegler-Natta catalysts and Phillips-type chromium catalyst well known in the art. Examples of conventional-type transition metal catalysts are disclosed in U.S. Pat. Nos. 4,115,639, 4,077,904 4,482,687, 4,564,605, 4,721,763, 4,879,359 and 4,960,741. The conventional-type transition metal catalyst compounds that may be used in the present invention include, but are not limited to transition metal compounds from Groups III to VIII of the Periodic Table of the Elements.

These conventional-type transition metal catalysts may be represented by the formula: $MR_x$, where M is a metal from Groups MB to VIII, preferably Group IVB, more preferably titanium; R is a halogen or a hydrocarbyloxy group; and x is the valence of the metal M. Non-limiting examples of R may include alkoxy, phenoxy, bromide, chloride and fluoride. Conventional-type transition metal catalysts where M is titanium may include, but are not limited to, $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3 \cdot \frac{1}{3}AlCl_3$ and $Ti(OC_{12}H_{25})Cl_3$.

Conventional-type transition metal catalyst compounds based on magnesium/titanium electron-donor complexes that are useful in the invention are described in, for example, U.S. Pat. Nos. 4,302,565 and 4,302,566. The $MgTiCl_6$ (ethyl acetate)$_4$ derivative is one such example. British Patent Application 2,105,355 describes various conventional-type vanadium catalyst compounds. Non-limiting examples of conventional-type vanadium catalyst compounds include vanadyl trihalide, alkoxy halides and alkoxides such as $VOCl_3$, $VOCl_2(OBu)$ where Bu=butyl and $VO(OC_2H_5)_3$; vanadium tetra-halide and vanadium alkoxy halides such as $VCl_4$ and $VCl_3(OBu)$; vanadium and vanadyl acetyl acetonates and chloroacetyl acetonates such as $V(AcAc)_3$ and $VOCl_2(AcAc)$ where (AcAc) is an acetyl acetonate. Examples of conventional-type vanadium catalyst compounds are $VOCl_3$, $VCl_4$ and $VOCl_2$—OR where R is a hydrocarbon radical, preferably a $C_1$ to $C_{10}$ aliphatic or aromatic hydrocarbon radical such as ethyl, phenyl, isopropyl, butyl, propyl, n-butyl, iso-butyl, tertiary-butyl, hexyl, cyclohexyl, naphthyl, etc., and vanadium acetyl acetonates.

Conventional-type chromium catalyst compounds, often referred to as Phillips-type catalysts, suitable for use in the present invention may include $CrO_3$, chromocene, silyl chromate, chromyl chloride ($CrO_2Cl_2$), chromium-2-ethylhexanoate, chromium acetylacetonate ($Cr(AcAc)_3$), and the like. Non-limiting examples are disclosed in, for example, U.S. Pat. Nos. 3,242,099 and 3,231,550.

Still other conventional-type transition metal catalyst compounds and catalyst systems suitable for use in the present invention are disclosed in U.S. Pat. Nos. 4,124,532, 4,302,565, 4,302,566 and 5,763,723 and published EP-A2 0 416 815 A2 and EP-A1 0 420 436. The conventional-type transition metal catalysts of the invention may also have the general formula $M'_tM''X_{2t}Y_u E$, where M' is Mg, Mn and/or Ca; t is a number from 0.5 to 2; M" is a transition metal Ti, V and/or Zr; X is a halogen, preferably Cl, Br or I; Y may be the same or different and is halogen, alone or in combination with oxygen, —$NR_2$, —OR, —SR, —COOR, or —OSOOR, where R is a hydrocarbyl radical, in particular an alkyl, aryl, cycloalkyl or arylalkyl radical, acetylacetonate anion in an amount that satisfies the valence state of M'; u is a number from 0.5 to 20; E is an electron donor compound selected from the following classes of compounds: (a) esters of organic carboxylic acids; (b) alcohols; (c) ethers; (d) amines; (e) esters of carbonic acid; (f) nitriles; (g) phosphoramides, (h) esters of phosphoric and phosphorus acid, and (j) phosphorus oxy-chloride. Non-limiting examples of complexes satisfying the above formula include: $MgTiCl_5 \cdot 2CH_3COOC_2H_5$, $Mg_3Ti_2Cl_{12}7CH_3COOC_2H_5$, $MgTiCl_5 \cdot 6C_2H_5OH$, $MgTiCl_5 \cdot 100CH_3OH$, $MgTiCl_5$ tetrahydrofuran, $MgTi_2Cl_{12}7C_6H_5CN$, $MgTi_2Cl_{12}6C_6H_5COOC_2H_5$, $MgTiCl_6 2CH_3COOC_2H_5$, $MgTiCl_6 6C_5H_5N$, $MgTiCl_5(OCH_3)2CH_3COOC_2H_5$, $MgTiCl_5N(C_6H_5)_2 3CH_3COOC_2H_5$, $MgTiBr_2Cl_42(C_2H_5)O$, $MnTiCl_5 4C_2H_5OH$, $Mg_3V_2Cl_{12} \cdot 7CH_3COOC_2H_5$, $MgZrCl_6 4$ tetrahydrofuran. Other catalysts may include cationic catalysts such as $AlCl_3$, and other cobalt and iron catalysts well known in the art.

The conventional-type transition metal catalyst compounds disclosed herein may be activated with one or more of the conventional-type cocatalysts described below.

Conventional Cocatalysts and Other Components

Conventional-type cocatalyst compounds for the above conventional-type transition metal catalyst compounds may be represented by the formula $M^3M^4_v X^2_c R^3_{b-c}$, wherein $M^3$ is a metal from Group IA, IIA, IIB and IIIA of the Periodic Table of Elements; $M^4$ is a metal of Group IA of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M^3R^3_k$, where $M^3$ is a Group IA, IIA, IIB or IIIA metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent hydrocarbon radical.

Examples of conventional-type organometallic cocatalyst compounds of Group IA, IIA and IIIA useful with the conventional-type catalyst compounds described above include, but are not limited to, methyllithium, butyllithium, dihexylmercury, butylmagnesium, diethylcadmium, benzylpotassium, diethylzinc, tri-n-butylaluminum, diisobutyl ethylboron, diethylcadmium, di-n-butylzinc and tri-n-amylboron, and, in particular, the aluminum alkyls, such as trihexyl-aluminum, triethylaluminum, trimethylaluminum, and tri-isobutylaluminum. Other conventional-type cocatalyst compounds may include mono-organohalides and hydrides of Group IIA metals, and mono- or di-organohalides and hydrides of Group IIIA metals. Non-limiting examples of such conventional-type cocatalyst compounds may include di-isobutylaluminum bromide, isobutylboron dichloride, methyl magnesium chloride, ethylberyllium chloride, ethylcalcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, di-bromo-aluminum hydride and bromocadmium hydride. Conventional-type organometallic cocatalyst compounds are known to those in the art and a more complete discussion of these compounds may be found in U.S. Pat. Nos. 3,221,002 and 5,093,415.

Metallocene Catalysts

Metallocene catalysts may include "half sandwich," (i.e., at least one ligand) and "full sandwich," (i.e., at least two ligands) compounds having one or more Cp ligands (cyclopentadienyl and ligands isolobal to cyclopentadienyl) bound to at least one Group 3 to Group 12 metal atom, and one or more leaving group(s) bound to the at least one metal atom. Hereinafter, these compounds will be referred to as "metallocene(s)" or "metallocene catalyst component(s)."

The one or more metallocene catalyst components may be represented by the formula (I):

$$Cp^A Cp^B MX_n \qquad (I)$$

The metal atom "M" of the metallocene catalyst compound, as described throughout the specification and claims, may be selected from the group consisting of Groups 3 through 12 atoms and lanthanide Group atoms in one embodiment; and selected from the group consisting of Groups 4, 5 and 6 atoms in yet a more particular embodiment, and a Ti, Zr, Hf atoms in yet a more particular embodiment, and Zr in yet a more particular embodiment. The groups bound the metal atom "M" are such that the compounds described below in the formulas and structures are neutral, unless otherwise indicated. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

In an embodiment, M is as described above; each X is chemically bonded to M; each Cp group is chemically bonded to M; and n is 0 or an integer from 1 to 4, or either 1 or 2.

The ligands represented by $Cp^A$ and $Cp^B$ in formula (I) may be the same or different cyclopentadienyl ligands or ligands isolobal to cyclopentadienyl, either or both of which may contain heteroatoms and either or both of which may be substituted by a group R. In one embodiment, $Cp^A$ and $Cp^B$ are independently selected from the group consisting of cyclopentadienyl, indenyl, tetrahydroindenyl, fluorenyl, and substituted derivatives of each.

Independently, each $Cp^A$ and $Cp^B$ of formula (I) may be unsubstituted or substituted with any one or combination of substituent groups R. Non-limiting examples of substituent groups R as used in structure (I) include hydrogen radicals, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos, and combinations thereof.

More particular non-limiting examples of alkyl substituents R associated with formula (i) includes methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls such as, for example, fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins such as but not limited to olefinically unsaturated substituents including vinyl-terminated ligands, for example 3-butenyl, 2-propenyl, 5-hexenyl and the like. In one embodiment, at least two R groups, two adjacent R groups in one embodiment, are joined to form a ring structure having from 3 to 30 atoms selected from the group consisting of carbon, nitrogen, oxygen, phosphorous, silicon, germanium, aluminum, boron and combinations thereof. Also, a substituent group R group such as 1-butanyl may form a bonding association to the element M.

Each X in formula (I) is independently selected from the group consisting of: any leaving group in one embodiment; halogen ions, hydrides, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos, and combinations thereof. In another embodiment, X is $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons, and substituted derivatives thereof. In some embodiments X is selected from hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls. In some embodiments X is selected from hydride, chloride, fluoride, methyl, phenyl, phenoxy, benzoxy, tosyl, fluoromethyls and fluorophenyls. In some embodiments X is selected from $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls and $C_1$ to $C_{12}$ heteroatom-containing alkylaryls in yet a more particular embodiment; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls. In some embodiments X is selected from fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls).

The metallocene catalyst compound and/or component may include those of formula (I) where $Cp^A$ and $Cp^B$ are bridged to each other by at least one bridging group, (A), such that the structure is represented by formula (II):

$$Cp^A(A)Cp^B MX_n \qquad (II)$$

These bridged compounds represented by formula (II) are known as "bridged metallocenes". $Cp^A$, $Cp^B$, M, X and n are as defined above for formula (I); and wherein each Cp ligand is chemically bonded to M, and (A) is chemically bonded to each Cp. Non-limiting examples of bridging group (A) include divalent alkyls, divalent lower alkyls, divalent substituted alkyls, divalent heteroalkyls, divalent alkenyls, divalent lower alkenyls, divalent substituted alkenyls, divalent heteroalkenyls, divalent alkynyls, divalent lower alkynyls, divalent substituted alkynyls, divalent heteroalkynyls, divalent alkoxys, divalent lower alkoxys, divalent aryloxys, divalent alkylthios, divalent lower alkyl thios, divalent arylthios, divalent aryls, divalent substituted aryls, divalent heteroaryls, divalent aralkyls, divalent aralkylenes, divalent alkaryls, divalent alkarylenes, divalent haloalkyls, divalent haloalkenyls, divalent haloalkynyls, divalent heteroalkyls, divalent heterocycles, divalent heteroaryls, divalent heteroatom-containing groups, divalent hydrocarbyls, divalent lower hydrocarbyls, divalent substituted hydrocarbyls, divalent heterohydrocarbyls, divalent silyls, divalent boryls, divalent phosphinos, divalent phosphines, divalent aminos, divalent amines, divalent ethers, divalent thioethers. Additional non-limiting examples of bridging group A include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group (A) may also contain substituent groups R as defined above for formula (I) including halogen radicals and iron. More particular non-limiting examples of bridging group (A) are represented by $C_1$ to $C_6$ alkylenes, substituted $C_1$ to $C_6$ alkylenes, oxygen, sulfur, R'$_2$C=, R'$_2$Si=, —Si(R')$_2$Si(R'$_2$)—, R'$_2$Ge=, R'P= (wherein "=" represents two chemical bonds), where R' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. The bridged metallocene catalyst component of formula (II) may have two or more bridging groups (A).

Other non-limiting examples of bridging group (A) include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties wherein the Si atom is replaced by a Ge or a C atom; dimethylsilyl, diethylsilyl, dimethylgermyl and diethylgermyl.

Bridging group (A) may also be cyclic, comprising, for example 4 to 10, 5 to 7 ring members in a more particular embodiment. The ring members may be selected from the elements mentioned above, from one or more of B, C, Si, Ge, N and O in a particular embodiment. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, in particular, Si and Ge. The bonding arrangement between the ring and the Cp groups may be either cis-, trans-, or a combination.

The cyclic bridging groups (A) may be saturated or unsaturated and/or carry one or more substituents and/or be fused to one or more other ring structures. If present, the one or more substituents are selected from the group consisting of hydrocarbyl (e.g., alkyl such as methyl) and halogen (e.g., F, Cl) in one embodiment. The one or more Cp groups which the above cyclic bridging moieties may optionally be fused to may be saturated or unsaturated and are selected from the group consisting of those having 4 to 10, more particularly 5, 6 or 7 ring members (selected from the group consisting of C, N, O and S in a particular embodiment) such as, for example, cyclopentyl, cyclohexyl and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

The ligands $Cp^A$ and $Cp^B$ of formula (I) and (II) are different from each other in one embodiment, and the same in another embodiment.

The metallocene catalyst components may include mono-ligand metallocene compounds (e.g., mono cyclopentadienyl catalyst components) such as described in WO 93/08221 for example which is incorporated herein by reference.

The at least one metallocene catalyst component may be an unbridged "half sandwich" metallocene represented by the formula (IV):

$$Cp^A MQ_q X_n \qquad\qquad (IV)$$

wherein $Cp^A$ is defined as for the Cp groups in (I) and is a ligand that is bonded to M; each Q is independently bonded to M; Q is also bound to $Cp^A$ in one embodiment; X is a leaving group as described above in (I); n ranges from 0 to 3, and is 1 or 2 in one embodiment; q ranges from 0 to 3, and is 1 or 2 in one embodiment. In one embodiment, $Cp^A$ is selected from the group consisting of cyclopentadienyl, indenyl, tetrahydroindenyl, fluorenyl, substituted version thereof, and combinations thereof.

In formula (IV), Q is selected from the group consisting of ROO⁻, RO—, R(O)—, —NR—, —CR$_2$—, —S—, —NR$_2$, —CR$_3$, —SR, —SiR$_3$, —PR$_2$, —H, and substituted and unsubstituted aryl groups, wherein R is selected from the group consisting of hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos, and combinations thereof. In some embodiments, R is selected from $C_1$ to $C_6$ alkyls, $C_6$ to $C_{12}$ aryls, $C_1$ to $C_6$ alkylamines, $C_6$ to $C_{12}$ alkylarylamines, $C_1$ to $C_6$ alkoxys, and $C_6$ to $C_{12}$ aryloxys. Non-limiting examples of Q include $C_1$ to $C_{12}$ carbamates, $C_1$ to $C_{12}$ carboxylates (e.g., pivalate), $C_2$ to $C_{20}$ allyls, and $C_2$ to $C_{20}$ heteroallyl moieties.

Described another way, the "half sandwich" metallocenes above can be described as in formula (II), such as described in, for example, U.S. Pat. No. 6,069,213:

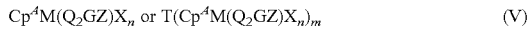

$$Cp^A M(Q_2 GZ)X_n \text{ or } T(Cp^A M(Q_2 GZ)X_n)_m \qquad\qquad (V)$$

wherein M, $Cp^A$, X and n are as defined above;

$Q_2 GZ$ forms a polydentate ligand unit (e.g., pivalate), wherein at least one of the Q groups form a bond with M, and is defined such that each Q is independently selected from the group consisting of —O—, —NR—, —CR$_2$— and —S—; G is either carbon or silicon; and Z is selected from the group consisting of R, —OR, —NR$_2$, —CR$_3$, —SR, —SiR$_3$, —PR$_2$, and hydride, providing that when Q is —NR—, then Z is selected from the group consisting of —OR, —NR$_2$, —SR, —SiR$_3$, —PR$_2$; and provided that neutral valency for Q is satisfied by Z; and wherein each R is independently selected from the group consisting of hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos, and combinations thereof. In another embodiment, R is selected from the group consisting of $C_1$ to $C_{10}$ heteroatom containing groups, $C_1$ to $C_{10}$ alkyls, $C_6$ to $C_{12}$ aryls, $C_6$ to $C_{12}$ alkylaryls, $C_1$ to $C_{10}$ alkoxys, and $C_6$ to $C_{12}$ aryloxys;

n is 1 or 2 in a particular embodiment;

T is a bridging group selected from the group consisting of $C_1$ to $C_{10}$ alkylenes, $C_6$ to $C_{12}$ arylenes and $C_1$ to $C_{10}$ heteroatom containing groups, and $C_6$ to $C_{12}$ heterocyclic groups; wherein each T group bridges adjacent "$Cp^A M(Q_2GZ)X_n$" groups, and is chemically bonded to the $Cp^A$ groups;

m is an integer from 1 to 7; m is an integer from 2 to 6 in a more particular embodiment.

The metallocene catalyst component can be described more particularly in structures (VIa), (VIb), (VIc), (VId), (VIe), and (VIf):

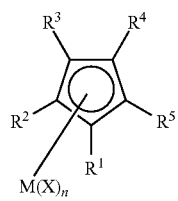

(VIa-i)

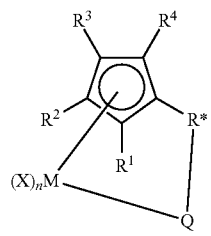

(VIa-ii)

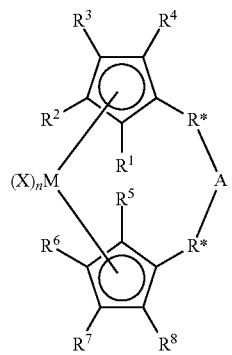

(VIb)

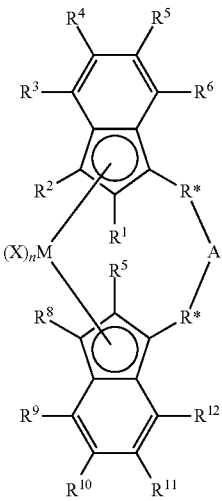

(VIc)

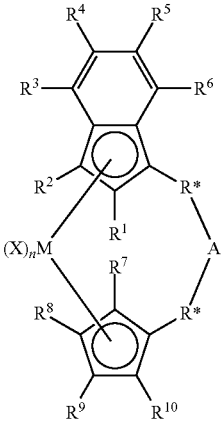

(VId)

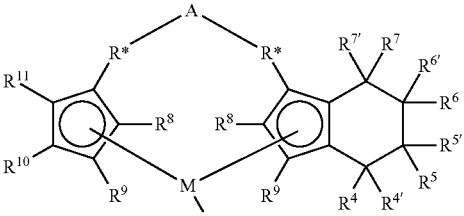

(VIe)

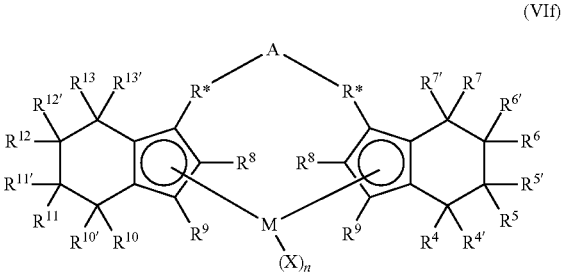

(VIf)

wherein in structures (VIa) to (VIf), M is selected from the group consisting of Group 3 to Group 12 atoms, selected from the group consisting of Group 3 to Group 10 atoms, selected from the group consisting of Group 3 to Group 6 atoms, selected from the group consisting of Group 4 atoms, selected from the group consisting of Zr and Hf; or is Zr; wherein Q in (VIa) to (VIf) is selected from the group consisting of hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos, alkylenes, aryls, arylenes, alkoxys, aryloxys, amines, arylamines (e.g., pyridyl) alkylamines, phosphines, alkylphosphines, substituted alkyls, substituted aryls, substituted alkoxys, substituted aryloxys, substituted amines, substituted alkylamines, substituted phosphines, substituted alkylphosphines, carbamates, heteroallyls, carboxylates (non-limiting examples of suitable carbamates and carboxylates include trimethylacetate, trimethylacetate, methylacetate, p-toluate, benzoate, diethylcarbamate, and dimethylcarbamate), fluorinated alkyls, fluorinated aryls, and fluorinated alkylcarboxylates; wherein the saturated groups defining Q comprise from 1 to 20 carbon atoms in one embodiment; and wherein the aromatic groups comprise from 5 to 20 carbon atoms in one embodiment; wherein R* may be selected from divalent alkyls, divalent lower alkyls, divalent substituted alkyls, divalent heteroalkyls, divalent alkenyls, divalent lower alkenyls, divalent substituted alkenyls, divalent heteroalkenyls, divalent alkynyls, divalent lower alkynyls, divalent substituted alkynyls, divalent heteroalkynyls, divalent alkoxys, divalent lower alkoxys, divalent aryloxys, divalent alkylthios, divalent lower alkyl thios, divalent arylthios, divalent aryls, divalent substituted aryls, divalent heteroaryls, divalent aralkyls, divalent aralkylenes, divalent alkaryls, divalent alkarylenes, divalent haloalkyls, divalent haloalkenyls, divalent haloalkynyls, divalent heteroalkyls, divalent heterocycles, divalent heteroaryls, divalent heteroatom-containing groups, divalent hydrocarbyls, divalent lower hydrocarbyls, divalent substituted hydrocarbyls, divalent heterohydrocarbyls, divalent silyls, divalent boryls, divalent phosphinos, divalent phosphines, divalent aminos, divalent amines, divalent ethers, divalent thioethers. Additionally, R* may be from the group of divalent hydrocarbylenes and heteroatom-containing hydrocarbylenes; selected from the group consisting of alkylenes, substituted alkylenes and heteroatom-containing hydrocarbylenes; selected from the group consisting of $C_1$ to $C_{12}$ alkylenes, $C_1$ to $C_{12}$ substituted alkylenes, and $C_1$ to $C_{12}$ heteroatom-containing hydrocarbylenes; or selected from the group consisting of $C_1$ to $C_4$ alkylenes. Both R* groups may be identical in structures (VIf);

A is as described above for (A) in structure (II), and more particularly, may be selected from the group consisting of a chemical bond, —O—, —S—, —SO$_2$—, —NR—, =SiR$_2$, =GeR$_2$, =SnR$_2$, —R$_2$SiSiR$_2$—, RP=, $C_1$ to $C_{12}$ alkylenes, substituted $C_1$ to $C_{12}$ alkylenes, divalent $C_4$ to $C_{12}$ cyclic hydrocarbons and substituted and unsubstituted aryl groups in one embodiment; selected from the group consisting of $C_5$ to $C_8$ cyclic hydrocarbons, —CH$_2$CH$_2$—, =CR$_2$ and =SiR$_2$; wherein and R is selected from the group consisting of alkyls, cycloalkyls, aryls, alkoxys, fluoroalkyls and heteroatom-containing hydrocarbons; R is selected from the group consisting of $C_1$ to $C_6$ alkyls, substituted phenyls, phenyl, and $C_1$ to $C_6$ alkoxys; or R is selected from the group consisting of methoxy, methyl, phenoxy, and phenyl; wherein A may be absent in yet another embodiment, in which case each R* is defined as for $R^1$-$R^{13}$; each X is as described above in (I); n is an integer from 0 to 4, and from 1 to 3 in another embodiment, and 1 or 2 in yet another embodiment; and $R^1$ through $R^{13}$ are independently: selected from the group consisting of hydrogen radicals, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos. through $R^{13}$ may also be selected independently from $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof; selected from the group consisting of hydrogen radical, fluorine radical, chlorine radical, bromine radical, $C_1$ to $C_6$ alkyls, $C_2$ to $C_6$ alkenyls, $C_7$ to $C_{18}$ alkylaryls, $C_1$ to $C_6$ fluoroalkyls, $C_2$ to $C_6$ fluoroalkenyls, $C_7$ to $C_{18}$ fluoroalkylaryls; or hydrogen radical, fluorine radical, chlorine radical, methyl, ethyl, propyl, isopropyl, butyl, isobutyl, tertiary butyl, hexyl, phenyl, 2,6-di-methylpheyl, and 4-tertiarybutylpheyl groups; wherein adjacent R groups may form a ring, either saturated, partially saturated, or completely saturated.

The structure of the metallocene catalyst component represented by (VIa) may take on many forms such as disclosed in, for example, U.S. Pat. No. 5,026,798, U.S. Pat. No. 5,703,187, and U.S. Pat. No. 5,747,406, including a dimer or oligomeric structure, such as disclosed in, for example, U.S. Pat. No. 5,026,798 and U.S. Pat. No. 6,069,213.

For the metallocene represented in (VId), $R^1$ and $R^2$ may form a conjugated 6-membered carbon ring system that may or may not be substituted.

It is contemplated that the metallocene catalysts components described above include their structural or optical or enantiomeric isomers (racemic mixture), or may be a pure enantiomer.

As used herein, a single, bridged, asymmetrically substituted metallocene catalyst component having a racemic and/or meso isomer does not, itself, constitute at least two different bridged, metallocene catalyst components.

The "metallocene catalyst compound", also referred to herein as the metallocene catalyst component" may comprise any combination of any embodiment described herein.

Metallocene compounds and catalysts are known in the art and any one or more may be utilized herein. Suitable metallocenes include but are not limited to all of the metallocenes disclosed and referenced in the U.S. patents cited above, as well as those disclosed and referenced in U.S. Pat. Nos. 7,179,876, 7,169,864, 7,157,531, 7,129,302, 6,995,109, 6,958,306, 6,884748, 6,689,847, U.S. Patent Application publication number 2007/0055028, and published PCT Application Nos. WO 97/22635, WO 00/699/22, WO 01/30860, WO 01/30861, WO 02/46246, WO 02/50088, WO 04/026921, and WO 06/019494, all fully incorporated herein by reference. Additional catalysts suitable for use herein include those referenced in U.S. Pat. Nos. 6,309,997, 6,265,338, U.S. Patent Application publication number 2006/019925, and the following articles: Chem Rev 2000, 100, 1253, Resconi; Chem Rev 2003, 103, 283; Chem Eur. J. 2006, 12, 7546 Mitsui; J Mol Catal A 2004, 213, 141; Macromol Chem Phys, 2005, 206, 1847; and J Am Chem Soc 2001, 123, 6847.

Group 15-Containing Catalysts

The catalyst composition may include one or metallocene catalysts as described above and/or other conventional polyolefin catalysts, as well as Group 15 atom containing catalysts described below.

"Group 15 atom containing" catalysts or "Group 15-containing" catalysts may include complexes of Group 3 to 12 metal atoms, wherein the metal atom is 2 to 8 coordinate, the coordinating moiety or moieties including at least two Group 15 atoms, and up to four Group 15 atoms. In one embodiment, the Group 15-containing catalyst component is a complex of a Group 4 metal and from one to four ligands such that the Group 4 metal is at least 2 coordinate, the coordinating moiety or moieties including at least two nitrogens. Representative Group 15-containing compounds are disclosed in, for example, WO 99/01460, EP A1 0 893 454, U.S. Pat. Nos. 5,318,935, 5,889,128, 6,333,389 B2 and 6,271,325 B1.

The Group 15-containing catalyst components may include Group 4 imino-phenol complexes, Group 4 bis (amide) complexes, and Group 4 pyridyl-amide complexes that are active towards olefin polymerization to any extent. The Group 15-containing catalyst component may include a bisamide compound such as $[(2,3,4,5,6Me_5C_6)NCH_2CH_2]_2NHZrBz_2$.

Mixed Catalysts

It is also within the scope of this invention that one type of catalyst compound described above can be combined with another type of catalyst compound described herein with one or more activators or activation methods described below.

It is further contemplated by the invention that other catalysts can be combined with the metallocene catalyst compounds of the invention. For example, see U.S. Pat. Nos. 4,937,299, 4,935,474, 5,281,679, 5,359,015, 5,470,811, and 5,719,241.

Additionally, one or more metallocene catalyst compounds or catalyst systems may be used in combination with one or more conventional-type catalyst compounds or catalyst systems. Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031 and PCT Publication WO 96/23010 published Aug. 1, 1996.

It is further contemplated that two or more conventional-type transition metal catalysts may be combined with one or more conventional-type cocatalysts. Non-limiting examples of mixed conventional-type transition metal catalysts are described in for example U.S. Pat. Nos. 4,154,701, 4,210,559, 4,263,422, 4,672,096, 4,918,038, 5,198,400, 5,237,025, 5,408,015 and 5,420,090.

Activators and Activation Methods for Catalyst Compounds

An activator is defined in a broad sense as any combination of reagents that increases the rate at which a transition metal compound oligomerizes or polymerizes unsaturated monomers, such as olefins. The catalyst compounds may be activated for oligomerization and/or polymerization catalysis in any manner sufficient to allow coordination or cationic oligomerization and/or polymerization.

The activator may be a Lewis-base, such as for example, diethyl ether, dimethyl ether, ethanol, or methanol. Other activators that may be used include those described in WO 98/07515 such as tris (2,2',2"-nonafluorobiphenyl) fluoroaluminate.

Combinations of activators may be used. For example, alumoxanes and ionizing activators may be used in combinations, see for example, EP-B1 0 573 120, WO 94/07928 and WO 95/14044 and U.S. Pat. Nos. 5,153,157 and 5,453,410. WO 98/09996 describes activating metallocene catalyst compounds with perchlorates, periodates and iodates including their hydrates. WO 98/30602 and WO 98/30603 describe the use of lithium (2,2'-bisphenyl-ditrimethylsilicate).4THF as an activator for a metallocene catalyst compound. WO 99/18135 describes the use of organo-boron-aluminum activators. EP-B1-0 781 299 describes using a silylium salt in combination with a non-coordinating compatible anion. WO 2007/024773 suggests the use of activator-supports which may comprise a chemically-treated solid oxide, clay mineral, silicate mineral, or any combination thereof. Also, methods of activation such as using radiation (see EP-B1-0 615 981), electro-chemical oxidation, and the like are also contemplated as activating methods for the purposes of rendering the neutral metallocene catalyst compound or precursor to a metallocene cation capable of polymerizing olefins. Other activators or methods for activating a metallocene catalyst compound are described in, for example, U.S. Pat. Nos. 5,849,852, 5,859,653 and 5,869,723 and PCT WO 98/32775.

Alumoxanes may also be utilized as an activator in the catalyst composition. Alumoxanes are generally oligomeric compounds containing —Al(R)—O— subunits, where R is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide. Mixtures of different alumoxanes and modified alumoxanes may also be used. For further descriptions, see U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and EP 0 561 476 A1, EP 0 279 586 B1, EP 0 516 476 A, EP 0 594 218 A1 and WO 94/10180.

Alumoxanes may be produced by the hydrolysis of the respective trialkylaluminum compound. MMAO may be produced by the hydrolysis of trimethylaluminum and a higher trialkylaluminum such as triisobutylaluminum. MMAO's are generally more soluble in aliphatic solvents and more stable during storage. There are a variety of methods for preparing alumoxane and modified alumoxanes, non-limiting examples of which are described in, for example, U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, WO 94/10180 and WO 99/15534. A visually clear methylalumoxane may be used. A cloudy or gelled alumoxane can be filtered to produce a clear solution or clear alumoxane can be decanted from the cloudy solution. Another alumoxane is a modified methyl alumoxane (MMAO) cocatalyst type 3A (commercially available from Akzo Chemicals, Inc. under the trade name Modified Methylalumoxane type 3A, disclosed in U.S. Pat. No. 5,041,584).

An ionizing or stoichiometric activator, neutral or ionic, such as tri (n-butyl) ammonium tetrakis (pentafluorophenyl)

boron, a trisperfluorophenyl boron metalloid precursor or a trisperfluoronapthyl boron metalloid precursor, polyhalogenated heteroborane anions (see, for example, WO 98/43983), boric acid (see, for example, U.S. Pat. No. 5,942,459) or combinations thereof, may also be used. The neutral or ionic activators may be used alone or in combination with alumoxane or modified alumoxane activators.

Examples of neutral stoichiometric activators may include tri-substituted boron, tellurium, aluminum, gallium and indium or mixtures thereof. The three substituent groups may be each independently selected from the group of alkyls, alkenyls, halogen, substituted alkyls, aryls, arylhalides, alkoxy and halides. The three substituent groups may be independently selected from the group of halogen, mono or multicyclic (including halosubstituted) aryls, alkyls, and alkenyl compounds and mixtures thereof; in a class of embodiments are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). Alternatively, the three groups are alkyls having 1 to 4 carbon groups, phenyl, napthyl or mixtures thereof. The three groups may be halogenated, in an embodiment fluorinated, aryl groups. In yet other illustrative embodiments, the neutral stoichiometric activator is trisperfluorophenyl boron or trisperfluoronapthyl boron.

Ionic stoichiometric activator compounds may contain an active proton, or some other cation associated with, but not coordinated to, or only loosely coordinated to, the remaining ion of the ionizing compound. Such compounds and the like are described in, for example, European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124.

Supports

The above described catalyst compounds may be combined with one or more supports using one of the support methods well known in the art or as described below. For example, in the catalyst compound may be used in a supported form, such as, deposited on, contacted with, or incorporated within, adsorbed or absorbed in, or on the support.

As used herein, the term "support" refers to compounds comprising Group 2, 3, 4, 5, 13 and 14 oxides and chlorides. Suitable supports include, for example, silica, magnesia, titania, zirconia, montmorillonite, phyllosilicate, alumina, silica-alumina, silica-chromium, silica-titania, magnesium chloride, graphite, magnesia, titania, zirconia, montmorillonite, phyllosilicate, and the like.

The support may possess an average particle size in the range of from about 0.1 to about 500 µm, or from about 1 to about 200 µm, or from about 1 to about 50 µm, or from about 5 to about 50 µm.

The support may have an average pore size in the range of from about 10 to about 1000 Å, or about 50 to about 500 Å, or 75 to about 350 Å.

The support may have a surface area in the range of from about 10 to about 700 m$^2$/g, or from about 50 to about 500 m$^2$/g, or from about 100 to about 400 m$^2$/g.

The support may have a pore volume in the range of from about 0.1 to about 4.0 cc/g, or from about 0.5 to about 3.5 cc/g, or from about 0.8 to about 3.0 cc/g.

The support, such as an inorganic oxide, may have a surface area in the range of from about 10 to about 700 m$^2$/g, a pore volume in the range of from about 0.1 to about 4.0 cc/g, and an average particle size in the range of from about 1 to about 500 µm. Alternatively, the support may have a surface area in the range of from about 50 to about 500 m$^2$/g, a pore volume of from about 0.5 to about 3.5 cc/g, and an average particle size of from about 10 to about 200 µm. In some embodiments, the surface area of the support is in the range is from about 100 to about 400 m$^2$/g and the support has a pore volume of from about 0.8 to about 3.0 cc/g and an average particle size of from about 5 to about 100 µm.

The catalyst compounds may be supported on the same or separate supports together with an activator, or the activator may be used in an unsupported form, or may be deposited on a support different from the supported catalyst compound.

There are various other methods in the art for supporting a polymerization catalyst compound. For example, the catalyst compound may contain a polymer bound ligand as described in, for example, U.S. Pat. Nos. 5,473,202 and 5,770,755; the catalyst may be spray dried as described in, for example, U.S. Pat. No. 5,648,310; the support used with the catalyst may be functionalized as described in European publication EP-A-0 802 203, or at least one substituent or leaving group is selected as described in U.S. Pat. No. 5,688,880.

Catalyst and Activator Compositions

As indicated hereinbefore, a "catalyst composition" includes one or more catalyst components utilized to polymerize olefins and may also include at least one activator or alternatively, at least one cocatalyst. A catalyst composition may also include other components, for example, supports, and is not limited to the catalyst component and/or activator or cocatalyst alone or in combination. The catalyst composition may include any suitable number of catalyst components in any combination as described herein, as well as any activator or cocatalyst in any combination as described herein.

It will also be understood that a "catalyst composition" may also contain one or more components known in the art to reduce or eliminate reactor fouling.

As used herein, the term "activator composition" is any composition comprising one or more activators or cocatalysts capable of activating a catalyst to polymerize olefins. An activator composition may also include other components, for example, supports, and is not limited to the activator or cocatalyst alone or in combination. The activator composition may include any suitable number of activator components in any combination as described herein.

It will also be understood that an "activator composition" may also contain one or more components known in the art to reduce or eliminate reactor fouling.

Continuity Compositions

As used herein, the term "continuity composition" is a composition comprising one or more components or additives or aids, such as solids or liquids, that are useful in gas phase or slurry phase polymerization processes to reduce or eliminate fouling of the reactor, where "fouling" may be manifested by any number of phenomena including sheeting of the reactor walls, plugging of inlet and outlet lines, formation of large agglomerates, or other forms of reactor upsets known in the art.

Common to the continuity compositions described herein is that they comprise at least one metal carboxylate salt which is modified by and/or which has been contacted with at least one molten fatty amine.

As used herein, the term "molten fatty amine" refers to a fatty amine that is substantially in the liquid state. Depending on the melting point of the fatty amine it will be understood that a fatty amine may be a liquid at ambient temperatures. Alternatively a fatty amine may be a solid or a wax at ambient temperatures. The application of heat may suitably convert solid or waxy fatty amines into liquids. The term "molten fatty amine" encompasses fatty amines that are liquids at ambient temperature and also fatty amines that are liquids at temperatures above ambient. Fatty amines which are in the liquid state either at ambient temperature or at a temperature above ambient may remain as liquids when slurried in a suitable liquid vehicle. For example, when a solid fatty amine is melted at a temperature above ambient temperature and the resulting liquid fatty amine added to a liquid vehicle which is at a lower temperature, then a liquid dispersion or emulsion may result. It will be understood that the term "molten fatty amine" includes dispersions of liquid fatty amines in suitable liquid vehicles, for example, dispersions of liquid fatty amines in mineral oil.

The at least one fatty amine may be present in the continuity composition at from about 0.1 to about 90 wt %, based on the total weight of the continuity composition. Within this range, the at least one fatty amine may be present in the continuity composition preferably at greater than or equal to about 0.5%, or 5%, or 10%, or 20%, or 30%, or 40%, or 50%, or 60% or 70%, or 80%, based on the total weight of the continuity composition. Also within this range, the at least one fatty amine may be present in the continuity composition preferably at less than or equal to about 75%, or 65%, or 55%, or 45%, or 35%, or 25%, or 15%, based on the total weight of the continuity composition. The at least one fatty amine may be present in the continuity composition in an amount in the range that comprises any upper and any lower boundary disclosed above.

The at least one metal carboxylate salt may be present in the continuity composition at from about 0.1 to about 90 wt %, based on the total weight of the continuity composition. Within this range, the at least one metal carboxylate salt may be present in the continuity composition at greater than or equal to about 0.5%, or 5%, or 10%, or 20%, or 30%, or 40%, or 50%, or 60% or 70%, or 80%, based on the total weight of the continuity composition. Also within this range, the at least one metal carboxylate salt may be present in the continuity composition at less than or equal to about 75%, or 65%, or 55%, or 45%, or 35%, or 25%, or 15%, based on the total weight of the continuity composition. The at least one metal carboxylate salt may be present in the continuity composition in an amount in the range that comprises any upper and any lower boundary disclosed above.

The at least one fatty amine may be represented by the formula:

$$(R_1)_xN(R_2OH)_y$$

wherein $R_1$ is a hydrocarbyl radical having from 9 to 40 carbon atoms;

$R_2$ is a hydrocarbyl radical having from 1 to 8 carbon atoms;
and x has a value of 1 or 2 and x+y=3.

$R_1$ may be a hydrocarbyl radical having from 14 to 26 carbon atoms. $R_2$ may be methyl, ethyl, n-propyl, n-butyl or iso-propyl. $R_1$ may also be a hydrocarbyl radical having from 14 to 26 carbon atoms and $R_2$ may be ethyl. A non-limiting example of a fatty amine is octadecyl bis(2-hydroxyethyl)amine.

As used herein, the term "metal carboxylate salt" is any mono- or di- or tri-carboxylic acid salt with a metal portion from the Periodic Table of Elements. Non-limiting examples include saturated, unsaturated, aliphatic, aromatic or saturated cyclic carboxylic acid salts. Examples of the carboxylate ligand include, but are not limited to, acetate, propionate, butyrate, valerate, pivalate, caproate, isobuytlacetate, t-butyl-acetate, caprylate, heptanate, pelargonate, undecanoate, oleate, octoate, palmitate, myristate, margarate, stearate, arachate and tercosanoate. Non-limiting examples of the metal portion includes a metal from the Periodic Table of Elements selected from the group of Al, Mg, Ca, Sr, Sn, Ti, V, Ba, Zn, Cd, Hg, Mn, Fe, Co, Ni, Pd, Li and Na.

The carboxylate metal salt may be represented by the following general formula:

$$M(Q)_x(OOCR)_y$$

where M is a metal from Group 3 to 16 and the Lanthanide and Actinide series, preferably from Groups 8 to 13, more preferably from Group 13 with aluminum being most preferred; Q is halogen, hydrogen, a hydroxy or hydroxide, alkyl, alkoxy, aryloxy, siloxy, silane or sulfonate group R is a hydrocarbyl radical having from 1 to 100 carbon atoms; and x is an integer from 0 to 3 and y is an integer from 1 to 4 and the sum of x and y is equal to the valence of the metal.

R in the above formula may be the same or different. Non-limiting examples of R include hydrocarbyl radicals having 2 to 100 carbon atoms that include alkyl, aryl, aromatic, aliphatic, cyclic, saturated or unsaturated hydrocarbyl radicals. R may be a hydrocarbyl radical having greater than or equal to 8 carbon atoms, greater than or equal to 12 carbon atoms, or greater than 14 carbon atoms. R may comprise a hydrocarbyl radical having from 17 to 90 carbon atoms, 17 to 72, or 17 to 54 carbon atoms. R may comprise 6 to 30 carbon atoms, 8 to 24 carbon atoms, or 16 to 18 carbon atoms (e.g., plamityl and stearyl).

Non-limiting examples of Q in the above formula include one or more, same or different, hydrocarbon containing group such as alkyl, cycloalkyl, aryl, alkenyl, arylalkyl, arylalkenyl or alkylaryl, alkylsilane, arylsilane, alkylamine, arylamine, alkyl phosphide, alkoxy having from 1 to 30 carbon atoms. The hydrocarbon containing group may be linear, branched, or even substituted. Also, Q in one embodiment is an inorganic group such as a halide, sulfate or phosphate.

The metal carboxylate salts may comprise aluminum carboxylates such as aluminum mono, di- and tri-stearates, aluminum octoates, oleates and cyclohexylbutyrates. The carboxylate metal salt may comprise $[CH_3(CH_2)_{16}COO]_3Al$, an aluminum tri-stearate, $[CH_3(CH_2)_{16}COO]_2-Al-OH$, an aluminum di-stearate, and $CH_3(CH_2)_{16}COO-Al(OH)_2$, an aluminum mono-stearate.

Other examples of metal carboxylate salts include titanium stearates, tin stearates, calcium stearates, zinc stearates, boron stearate and strontium stearates.

The metal carboxylate salts for use herein may be essentially free of carboxylic acids, wherein the carboxylic acids are represented by the formula RCOOH, wherein R is a hydrocarbyl radical having from 6 to 30 carbon atoms. The metal carboxylate salt may have less than or equal to about 1 wt % of total free carboxylic acid, based on the total weight of the metal carboxylate salt as determined chromatographically, or less than or equal to about 0.5 wt %, or less than or equal to about 0.1 wt % of total free carboxylic acid, based on the total weight of the metal carboxylate salt.

In an embodiment, the metal carboxylate salt which is essentially free of free acid is produced by extracting a metal carboxylate salt with an organic solvent having a dielectric constant at 25° C. of greater than 3.0. This polar solvent results in an improved extraction of the polar compounds including the free acids present in the crude metal carboxylate salt. In an embodiment, the metal carboxylate salt combined with the catalyst compound has been previously extracted with an organic solvent to remove carboxylic acids, Group 1 salts of carboxylic acids, and/or Group 2 salts of carboxylic acids, wherein the organic solvent is selected from the group consisting of $C_1$-$C_{10}$ alcohols, $C_1$-$C_{10}$ ketones, $C_1$-$C_{10}$ esters, $C_1$-$C_{10}$ ethers, $C_1$-$C_{10}$ alkyl halides, $C_1$-$C_{10}$ alkylonitriles, $C_1$-$C_{10}$ dialkyl sulfoxides, and combinations thereof. In another embodiment, the organic solvent is selected from the group consisting of methanol, ethanol, propanol, isopropanol, butanol, acetone, methylethyl ketone, methyl acetate, ethyl acetate, methyl propionate, methyl buterate, dimethyl ether, diethyl ether, 1,4-dioxane, tetrahydrofuran, chloroform, dichloromethane, acetonitrile, dimethyl sulfoxide, and combinations thereof. Such metal carboxylate salts, which are essentially free of carboxylic acids, are described in US Patent Application Pubn. No. 20130245215.

The continuity composition may further comprise at least one liquid vehicle. Non-limiting examples of liquid vehicles include mineral oils, aromatic hydrocarbons or aliphatic hydrocarbons. Mineral oils are preferred liquid vehicles.

The continuity composition may be in the form of a slurry in the one or more liquid vehicles at from about 1% to about 60% wt. % based on the total weight of the slurry. Within this range the continuity composition is present in the slurry at greater than or equal to about 1%, or 2%, or 4%, or 6%, or 10%, or 15%, or 20%, or 25%, or 30%, or 40%, or 50%, based on the total weight of the slurry.

When a liquid vehicle is present, the continuity composition may comprise at least one fatty amine in an amount greater than or equal to about 0.5%, or 1%, or 2%, or 3%, or 4%, or 5%, or 6%, or 7%, or 8%, or 10%, or 12%, or 15% by weight, based on the total weight of the continuity composition including liquid vehicle.

When a liquid vehicle is present, the continuity composition may comprise at least one metal carboxylate salt in an amount greater than or equal to about 0.5%, or 1%, or 2%, or 3%, or 4%, or 5%, or 6%, or 7%, or 8%, or 10% or 12% or 15% by weight, based on the total weight of the continuity composition including liquid vehicle.

When a liquid vehicle is present the continuity composition may preferably comprise:
a) 2-20 wt. % of at least one metal carboxylate salt,
b) 2-20 wt. % of at least one fatty amine, and
c) at least one liquid vehicle;
based on the total weight percent of a), b) and c).

Alternatively the continuity composition may preferably comprise:
a) 3-15 wt. % of at least one metal carboxylate salt,
b) 3-15 wt. % of at least one fatty amine, and
c) at least one liquid vehicle;
based on the total weight percent of a), b) and c).

The fatty amine may further comprise a particulate inorganic oxide. Non limiting examples of particulate inorganic oxides include silica or alumina. The inorganic oxide may possess an average particle size in the range of from about 0.1 to about 100 μm, or from about 0.5 to about 50 μm, or from about 0.5 to about 20 μm, or from about 0.5 to about 10 μm. The amount of particulate oxide in the fatty amine may be from 1 to 50 wt % based on the total weight of fatty amine and inorganic oxide. The amount of particulate oxide in the fatty amine may be from 5 to 30 wt %, based on the total weight of fatty amine and inorganic oxide. Additionally, the amount of particulate oxide in the fatty amine may be from 7 to 20 wt % based on the total weight of fatty amine and inorganic oxide.

Additional Continuity Additives/Aids

In addition to the "continuity compositions" described above, it may also be desirable to use one or more additional continuity additives to, for example, aid in regulating static levels in the reactors. The continuity additive may be used as a part of the catalyst composition or introduced directly into the reactor independently of the catalyst composition. The continuity additive may be supported on the inorganic oxide of the supported catalyst composition described herein.

Non-limiting examples of continuity additives include fatty amines, amide-hydrocarbon or ethoxylated-amide compounds such as described as "surface modifiers" in WO 96/11961; carboxylate compounds such as aryl-carboxylates and long chain hydrocarbon carboxylates, and fatty acid-metal complexes; alcohols, ethers, sulfate compounds, metal oxides and other compounds known in the art. Some specific examples of continuity additives include 1,2-diether organic compounds, magnesium oxide, ARMOSTAT 310, ATMER 163, ATMER AS-990, and other glycerol esters, ethoxylated amines (e.g., N,N-bis(2-hydroxyethyl)octadecylamine), alkyl sulfonates, and alkoxylated fatty acid esters; STADIS 450 and 425, KEROSTAT CE 4009 and KEROSTAT CE 5009. chromium N-oleylanthranilate salts, calcium salts of a Medialan acid and di-tert-butylphenol; POLYFLO 130, TOLAD 511 (a-olefin-acrylonitrile copolymer and polymeric polyamine), EDENOL D32, aluminum stearate, sorbitan-monooleate, glycerol monostearate, methyl toluate, dimethyl maleate, dimethyl furnarate, triethylamine, 3,3-diphenyl-3-(imidazol-1-yl)-propin, and like compounds.

Any of the aforementioned additional continuity additives may be employed either alone or in combination as an additional continuity additive.

Other additional continuity additives useful in embodiments disclosed herein are well known to those in the art. Regardless of which additional continuity additives are used, care should be exercised in selecting an appropriate additional continuity additive to avoid introduction of poisons into the reactor. In addition, in selected embodiments, the smallest amount of the additional continuity additives necessary to bring the static charge into alignment with the desired range should be used.

The additional continuity additives may be added to the reactor as a combination of two or more of the above listed additional continuity additives. The additional continuity additive(s) may be added to the reactor in the form of a solution or a slurry, such as a slurry with a mineral oil, and may be added to the reactor as an individual feed stream or may be combined with other feeds prior to addition to the reactor. For example, the additional continuity additive may be combined with the catalyst or catalyst slurry prior to feeding the combined catalyst-static control agent mixture to the reactor.

The additional continuity additives may be added to the reactor in an amount ranging from about 0.05 to about 200 ppmw, or from about 2 to about 100 ppmw, or from about 2 to about 50 ppmw, based on the polymer production rate. The additional continuity additives may also be added to the reactor in an amount of about 2 ppmw or greater, based on the polymer production rate.

Methods of Making the Continuity Compositions

A method for making the present continuity compositions may involve contacting one or more metal carboxylate salts with a molten fatty amine. It is understood that contacting may also refer to combining, blending, mixing, or the like. The contacting may take place in the presence or absence of a suitable liquid vehicle.

The molten fatty amine may be slurried in a suitable liquid vehicle prior to contacting with the one or more metal carboxylate salts. The slurry may be a dispersion or emulsion of the fatty amine in the liquid vehicle.

The at least one metal carboxylate salt and at least one fatty amine may be spray dried or spray congealed. The resulting spray dried powder may be subsequently slurried in a suitable liquid vehicle. The skilled person would be familiar with the various spray drying techniques known in the art.

The product of combining the one or more metal carboxylate salts with the one or more molten fatty amines may be contacted with further metal carboxylate salt. The contacting may take place in the presence or absence of a suitable liquid vehicle. The contacting may take place in the presence of a liquid vehicle. The amount of further metal carboxylate salt added preferably results in a continuity composition having a total amount of metal carboxylate salt between about 2-20 wt. % and an amount of fatty amine between about 2-20 wt. % based on the total weight of metal carboxylate salts, fatty amine and liquid vehicle.

The fatty amine may be heated in order to provide a free flowing liquid prior to contacting with the one or more metal carboxylate salts. The temperature required to melt that fatty amine will depend on its melting point. The temperature may be greater than 20° C., or 30° C., or 40° C., or 50° C., or 60° C., or 70° C., or 80° C., or 90° C., or 100° C., or 110° C., or 120° C., or 130° C.

The molten fatty amine may be dried, that is, subjected to a process to reduce the level of moisture, prior to contacting with the one or more metal carboxylate salts. The drying temperature may be greater than 20° C., or 30° C., or 40° C., or 50° C., or 60° C., or 70° C., or 80° C., or 90° C., or 100° C., or 110° C., or 120° C., or 130° C.

Contacting the one or more metal carboxylate salts with the molten fatty amine may be performed at elevated temperature. The temperature may be greater than 20° C., or 30° C., or 40° C., or 50° C., or 60° C., or 70° C., or 80° C., or 90° C., or 100° C., or 110° C., or 120° C., or 130° C. Additionally, the temperature may be greater than 20° C., or 30° C., or 40° C., or 50° C., or 60° C., or 70° C.

The continuity composition may be dried to remove residual moisture which may otherwise adversely affect the activity of olefin polymerization catalysts. The continuity composition may be dried at elevated temperatures preferably at greater than 20° C., or 30° C., or 40° C., or 50° C., or 60° C., or 70° C., or 80° C., or 90° C., or 100° C., or 110° C., or 120° C., or 130° C. Preferably the drying temperature may be less than 90° C., or 80° C., or 70° C., or 60° C., or 50° C., or 40° C.

Drying of the continuity composition may be performed under vacuum conditions. Drying may also be facilitated by nitrogen purging or sparging through the solid or slurry.

The continuity composition may contain less than 1000 ppm, or 800 ppm or 500 ppm, or 300 ppm, or 200 ppm moisture. Preferably the continuity composition contains no more than 200 ppm moisture.

Techniques and equipment contemplated for use in the methods hereinbefore disclosed are understood. Mixing or contacting techniques may involve any mechanical mixing means, for example shaking, stirring, tumbling, spray drying and rolling. Another technique contemplated involves the use of fluidization, for example, in a fluid bed reactor vessel where circulated gases provide the contacting.

Methods of Using the Continuity Compositions

One skilled in the art recognizes that depending on the olefin polymerization composition used, certain conditions of temperature and pressure would be required to prevent, for example, a loss in the activity of the catalyst system.

A continuity composition as hereinbefore described may be introduced directly into the polymerization reactor independently of a catalyst composition. The continuity composition may be in the form of a slurry in a suitable liquid vehicle.

A continuity composition as hereinbefore described may also be introduced into the polymerization reactor along with a catalyst composition. That is, mixed with a catalyst composition. It will be appreciated that the exact method of introduction may vary depending on one or more of the conditions, temperature and pressure, the type of mixing apparatus, the quantities of the components to be combined, and even the mechanism for introducing the catalyst/continuity composition combination into the reactor.

The ratios of amount of continuity composition to the amount of polymer produced in the reactor at any time may be between 0.5 ppm and 1000 ppm, between 1 ppm and 400 ppm, or between 5 ppm and 50 ppm.

Polymerization Processes

Polymerization processes may include solution, gas phase, slurry phase and a high pressure process or a combination thereof. In illustrative embodiments, a gas phase or slurry phase polymerization of one or more olefins at least one of which is ethylene or propylene is provided. Optionally, the reactor is a gas phase fluidized bed polymerization reactor.

The continuity compositions as hereinbefore described are suitable for use in any prepolymerization and/or polymerization process over a wide range of temperatures and pressures. The temperatures may be in the range of from −60° C. to about 280° C., from 50° C. to about 200° C.; from 60° C. to 120° C., from 70° C. to 100° C., or from 80° C. to 95° C.

In one embodiment, the present process is directed toward a solution, high pressure, slurry or gas phase polymerization process of one or more olefin monomers having from 2 to 30 carbon atoms, preferably 2 to 12 carbon atoms, and more preferably 2 to 8 carbon atoms. The process is particularly well suited to the polymerization of two or more olefins or comonomers such as ethylene, propylene, 1-butene, 1-pentene, 4-methyl-1-pentene, 1-hexene, 1-octene 1-decene or the like.

Other olefins useful in the present process include ethylenically unsaturated monomers, diolefins having 4 to 18 carbon atoms, conjugated or nonconjugated dienes, polyenes, vinyl monomers and cyclic olefins. Useful monomers may include, but are not limited to, norbornene, norbornadiene, isobutylene, isoprene, vinylbenzocyclobutane, styrenes, alkyl substituted styrene, ethylidene norbornene, dicyclopentadiene and cyclopentene. In an illustrative embodiment of the present process, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process. In another embodiment of the present process, ethylene or propylene is polymerized with at least two different comonomers, optionally one of which may be a diene, to form a terpolymer.

In one embodiment, the present process is directed to a polymerization process, particularly a gas phase or slurry phase process, for polymerizing propylene alone or with one or more other monomers including ethylene, and/or other olefins having from 4 to 12 carbon atoms. The polymerization process may comprise contacting ethylene and optionally an alpha-olefin with one or more of the continuity compositions as hereinbefore described along with one or more catalyst compositions in a reactor under polymerization conditions to produce the ethylene polymer or copolymer.

Suitable gas phase polymerization processes are described in, for example, U.S. Pat. Nos. 4,543,399, 4,588, 790, 5,028,670, 5,317,036, 5,352,749, 5,405,922, 5,436,304, 5,453,471, 5,462,999, 5,616,661, 5,668,228, 5,627,242, 5,665,818, and 5,677,375, and European publications EP-A-0 794 200, EP-A-0 802 202, EP-A2 0 891 990, and EP-B-634 421.

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

A preferred polymerization process is referred to as a particle form polymerization, or a slurry process where the temperature is kept below the temperature at which the polymer goes into solution. Such technique is well known in the art, and described in for instance U.S. Pat. No. 3,248, 179. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484. Examples of solution processes are described in U.S. Pat. Nos. 4,271,060, 5,001,205, 5,236,998 and 5,589,555.

EXAMPLES

It is to be understood that while the present disclosure has been described in conjunction with the specific embodiments thereof, the foregoing description is intended to illustrate and not limit the scope of the disclosure. Other aspects, advantages and modifications will be apparent to those skilled in the art to which the disclosure pertains. Therefore, the following examples are put forth so as to provide those skilled in the art with a complete disclosure and description of how to make and use the disclosed compositions, and are not intended to limit the scope of the disclosure.

Comparative Composition

A comparative continuity composition was prepared as a 50:50 mixture by weight of solid aluminum distearate and solid IRGASTAT AS-990 in Hydrobrite® 380 mineral oil. The reagents were mixed at 30° C. and the resulting slurry was dried at 30° C. under vacuum with nitrogen purge to less than 200 ppm moisture content. The resulting slurry contained about 10% by weight of each solid component based on the total weight of the slurry. IRGASTAT AS-990 is a commercially available mixture of octadecyl bis(2-hydroxyethyl)amine and amorphous silica. Attempts to dry the slurry at temperatures above 35° C. resulted in gelling of the product.

Inventive Composition 1

An inventive continuity composition was prepared as a 50:50 mixture by weight of solid aluminum distearate and molten IRGASTAT AS-990 in mineral oil. Aluminium distearate, prepared according to International Patent Application Publication No. WO 2012/074709 and mineral oil were heated to 75° C. with stirring for 30 minutes. Molten AS-990 (80-85° C.) was added to the mineral oil and aluminium distearate. The slurry was mixed for an additional 30 minutes at 75° C. and then cooled to 15° C. The final composition contained 5 wt % aluminium distearate and 5 wt % AS-990.

Inventive Composition 2

An inventive continuity composition was prepared by combining aluminum distearate and Hydrobrite® 380 mineral oil. The resulting slurry was then heated to about 65° C. before molten octadecyl bis(2-hydroxyethyl)amine) was added. The slurry was dried at 65° C. under vacuum and with nitrogen purge until the moisture level in the slurry was below 200 ppm. The final slurry contained 10 wt % aluminum distearate, 9 wt % octadecyl bis(2-hydroxyethyl)amine, and 81 wt % of Hydrobrite® 380 oil.

Catalysts

In the examples that follow catalyst 'A1' is bis(n-propylcyclopentadiene)hafniumdimethyl and methylalumoxane supported on silica. The catalyst was a dry powder and was injected directly into the fluidized bed of a polymerization reactor using purified nitrogen as a carrier. Methods of preparing the catalyst are disclosed in, for example, International Patent Application Publication No. WO 2014/011357.

Catalyst 'A2' is similar in composition to catalyst 'A1' except that it is supported on a larger particle size silica.

Catalyst 'B' is a bi-metallic catalyst comprising (tetramethylcyclopentadiene)(n-propylcyclopentadiene) zirconium dichloride and bis(2-(pentamethylphenylamido)ethyl)amine zirconium dibenzyl supported on fumed silica with methylalumoxane. Methods of preparing the catalyst are disclosed in, for example, U.S. Pat. No. 6,271,325. This catalyst was a slurry in purified mineral oil.

Catalyst 'C' is a bi-metallic catalyst comprising bis(n-butylcyclopentadiene) zirconium dichloride and bis(2-(pentamethylphenylamido) ethyl)amine zirconium dibenzyl in a mole ratio of 1:5.5, supported on fumed silica with methylalumoxane. Methods of preparing the catalyst are disclosed in, for example, U.S. Pat. No. 6,271,325. This catalyst was a slurry in a mixture of purified mineral oil and Isopar™ C fluid.

Polymerisation Testing

The above described continuity compositions (comparative and inventive 1 and inventive 2) and catalysts (A1, A2, B and C) were tested in three pilot plant reactors of differing scale.

Pilot Plant Reactor 1

A gas phase fluidized bed reactor of 0.35 meters internal diameter and 2.3 meters in bed height was utilized. The fluidized bed was made up of polymer granules and the gaseous feed streams of ethylene and hydrogen together with liquid 1-hexene comonomer were introduced below the reactor bed into the recycle gas line. The individual flow rates of ethylene, hydrogen and 1-hexene were controlled to maintain fixed composition targets. The ethylene concentration was controlled to maintain a constant ethylene partial pressure. The hydrogen was controlled to maintain constant hydrogen to ethylene mole ratio. The concentrations of all the gases were measured by an on-line gas chromatograph to ensure relatively constant composition in the recycle gas stream. The reacting bed of growing polymer particles was maintained in a fluidized state by the continuous flow of the make-up feed and recycle gas through the reaction zone. A superficial gas velocity of 0.6-0.9 meters/sec was used to achieve this. The reactor was operated at a total pressure of 2240 kPa. The reactor was operated at a constant reaction temperature of 105° C. The fluidized bed was maintained at a constant height by withdrawing a portion of the bed at a rate equal to the rate of formation of particulate product. The polymer production rate was in the range of 15-25 kg/hour. The product was removed semi-continuously via a series of valves into a fixed volume chamber. This product was purged to remove entrained hydrocarbons and treated with a small stream of humidified nitrogen to deactivate any trace quantities of residual catalyst.

The continuity composition slurries were charged to an agitated slurry feeding vessel and were metered to the reactor at a rate to maintain the desired concentration in the bed based on polymer production rate. An inert hydrocarbon was used as a carrier medium.

Results

Pilot plant reactor 1 was operated using catalyst 'B' described above to produce a bimodal nominally 0.9495 density product. The reaction conditions were:

| Reaction Temperature | 105° C. |
|---|---|
| C2 Partial Pressure | 220 psia |
| C6/C2 molar ratio | 0.0055 |
| H2/C2 molar ratio | 0.002 |

As indicated in Table 1, based on material balance, the inventive 1 continuity composition gave about a 15% improvement in catalyst productivity over the comparative continuity composition.

TABLE 1

Inventive 1 and Comparative Compositions

| Continuity Composition Type | Inventive 1 | Comparative |
|---|---|---|
| Continuity Composition Level, ppm | 39.7 | 44.5 |
| Residence Time, (hrs) | 3.2 | 3.6 |
| Melt Index | 6.9 | 8.1 |
| Melt Flow Ratio I21/I5 | 36.4 | 37.2 |
| Density (g/cc) | 0.9492 | 0.9495 |
| Catalyst Productivity (matl. bal) | 8721 | 7782 |

Pilot Plant Reactor 2

Another set of tests was carried out in a larger continuous pilot-scale gas phase fluidized bed reactor having a 0.6 meters internal diameter and 4.4 meters in bed height. The polymer production rate was in the range of 40-50 kg/hour.

A series of experiments was undertaken to compare the comparative continuity composition with the inventive 2 continuity composition. A total of four experiments; two experiments using catalyst 'A1' and two experiments using catalyst 'A2' were completed. Reactor gas compositions were held constant for each respective two part experiment to obtain accurate results on catalyst productivity and static differences. There were no significant differences in catalyst productivity and static trends observed. Table 2 below indicates that both continuity compositions gave comparable catalyst productivity based on material balance methods. Furthermore the reactor skin temperatures and static measurements indicated no difference in behavior.

TABLE 2

Comparison of Inventive 2 and Comparative Compositions on Catalyst 'A1' and 'A2' performance

| Catalyst Type | Continuity Composition | PPMw in polymer* | Cat Activity matl balance (kg/kg) | Partial Pressure C2 | H2/C2 analyzer ratio (ppm/mole %) | C6/C2 analyzer ratio | Bed Temperature ° C. |
|---|---|---|---|---|---|---|---|
| 'A1' | Comparative | 31.8 | 8140 | 201 | 5 | 0.0169 | 80.7 |
| 'A1' | Inventive 2 | 29.0 | 8915 | 201 | 5 | 0.0166 | 80.7 |
| 'A2' | Comparative | 28.3 | 10665 | 201 | 4.6 | 0.0165 | 79 |
| 'A2' | Inventive 2 | 30.5 | 9904 | 201 | 4.6 | 0.0166 | 79 |

*refers to the continuity composition feed rate based on polymer production rate.

A further test was performed using catalyst 'B' under different process conditions and the results are summarized in Table 3. The inventive continuity composition showed an increase in catalyst productivity compared to the comparative continuity composition. The two continuity compositions showed comparable performance to each other with no reactor continuity issues experienced.

TABLE 3

Comparison of Inventive 2 and Comparative Compositions on Catalyst 'B' performance

| Catalyst | Continuity Composition | PPMw in polymer* | Cat Activity matl balance (kg/kg) | Partial Pressure C2 | H2/C2 analyzer ratio (ppm/mole %) | C6/C2 analyzer ratio | Bed Temperature ° C. |
|---|---|---|---|---|---|---|---|
| 'B' | Comparative | 39.1 | 4802 | 220 | 20 | 0.00633 | 105 |
| 'B' | Inventive 2 | 34.4 | 5781 | 220 | 20 | 0.00588 | 105 |

*refers to the continuity composition feed rate based on polymer production rate.

A further test was performed using catalyst 'C' under different process conditions and the results are summarized in Table 4. The results show the catalyst productivity is comparable between the two continuity compositions with no significant differences. There were no significant differences in static or skin temperatures observed and no continuity issues were experienced.

TABLE 4

Comparison of Inventive 2 and Comparative Compositions on Catalyst 'C' performance

| Catalyst | Continuity Composition | PPMw in polymer* | Cat Activity matl balance (kg/kg) | Partial Pressure C2 | H2/C2 analyzer ratio (ppm/mole %) | C6/C2 analyzer ratio | Bed Temperature ° C. |
|---|---|---|---|---|---|---|---|
| 'C' | Inventive 2 | 36.3 | 10,525 | 220 | 10 | 0.00050 | 105 |
| 'C' | Comparative | 36.0 | 10,598 | 220 | 10 | 0.00060 | 105 |

*refers to the continuity composition feed rate based on polymer production rate.

Pilot Plant Reactor 3

Another set of tests was performed in a large scale gas phase fluidized bed reactor of 2.44 meters internal diameter and 12.2 meters in bed height and utilizing catalyst 'C'. Production rate was around 4,500 kg/hr.

The reactor was initially operated using the comparative continuity additive to produce a bimodal product suitable for blow molding applications with 23.7 FI, and 0.9579 density. The reactor was then transitioned to the inventive 2 continuity composition and operated for 5 bed turnovers to produce a bimodal blow molding product with 30.2 FI, and 0.9582 density. The reactor was later transitioned from inventive 2 continuity composition to comparative continuity composition to produce a bimodal blow molding product with 30.9 FI, and 0.9584 density and operated for 2 bed turnovers. The reaction conditions for these experiments are as shown in Table 5 below.

TABLE 5

Comparison of Inventive 2 and Comparative Compositions on Catalyst 'C' performance

| Catalyst | Continuity Composition | PPMw in polymer* | Cat Activity matl balance (kg/kg) | Partial Pressure C2 | H2/C2 molar ratio | C6/C2 analyzer ratio | Bed Temperature ° C. |
|---|---|---|---|---|---|---|---|
| 'C' | Comparative | 47.8 | 13,146 | 220 | 0.0009 | 0.0006 | 105 |
| 'C' | Inventive 2 | 47.8 | 14,941 | 220 | 0.001 | 0.0007 | 105 |
| 'C' | Comparative | 46.1 | 14,798 | 220 | 0.001 | 0.0007 | 105 |

*refers to the continuity composition feed rate based on polymer production rate The static profile remained close to baseline and was comparable for both inventive and comparative continuity compositions.

Another set of tests was carried out in the large scale gas phase fluidized bed reactor. The reactor was operated using catalyst 'B' and inventive continuity composition 2 to produce a product suitable for pipe application with 5-7 FI and 0.9495 to 0.9505 density. The reactor was then operated under comparable conditions except for switching from inventive 2 to comparative continuity compositions to produce similar product at the following reaction conditions (Table 6).

TABLE 6

Comparison of Inventive 2 and Comparative Compositions on Catalyst 'B' performance

| Catalyst | Continuity Composition | PPMw in polymer* | Cat Activity matl balance (kg/kg) | Partial Pressure C2 | Ppm H2/mole % C2 | C6/C2 analyzer ratio | Bed Temperature ° C. |
|---|---|---|---|---|---|---|---|
| 'B' | Inventive 2 | 45 | 8,280 | 220 | 20 | 0.0041 | 105 |
| 'B' | Comparative | 47.6 | 8,274 | 220 | 20.3 | 0.0041 | 105 |

*refers to the continuity composition feed rate based on polymer production rate.

The static profile remained close to baseline throughout the experiments.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited.

All documents cited are herein fully incorporated by reference for all jurisdictions in which such incorporation is permitted and to the extent such disclosure is consistent with the description of the present invention.

What is claimed is:

1. A process for producing a continuity composition, comprising the step of contacting at least one metal carboxylate salt with at least one molten fatty amine; and
   contacting at least one metal carboxylate salt and at least one molten fatty amine in at least one liquid vehicle, so as to form a slurry of the continuity composition in said liquid vehicle.

2. The process of claim 1, comprising the steps of:
   a) combining the at least one metal carboxylate salt with the liquid vehicle; and
   b) adding the at least one molten fatty amine to the mixture formed in a) so as to form a slurry of the continuity composition in said liquid vehicle.

3. The process of claim 2 wherein step a) is performed at a temperature from between about 20° C. and about 80° C.

4. The process of claim 3, comprising the steps of:
   c) combining the at least one molten fatty amine with the liquid vehicle; and
   d) adding the at least one metal carboxylate salt to the mixture formed in a) so as to form a slurry of the continuity composition in said liquid vehicle.

5. The process of claim 2, wherein the process further comprises the step of:
   drying the slurry formed in step b) until the moisture level is below 1000 ppm.

6. The process of claim 1 wherein the at least one fatty amine is represented by the formula:

$(R_1)_xN(R_2OH)_y$ wherein
   $R_1$ is a hydrocarbyl radical having from 9 to 40 carbon atoms;
   $R_2$ is a hydrocarbyl radical having from 1 to 8 carbon atoms;
   and
   x has a value of 1 or 2 and x+y=3.

7. The process of claim 1 wherein the at least one metal carboxylate salt is represented by the formula:

$M(Q)_x(OOCR)_y$ wherein M is a metal from Group 3 to 16 and the Lanthanide and Actinide series, Q is halogen, hydrogen, a hydroxy or hydroxide, alkyl, alkoxy, aryloxy, siloxy, silane or sulfonate group, R is a hydrocarbyl radical having from 1 to 100 carbon atoms, and x is an integer from 0 to 3 and y is an integer from 1 to 4 and the sum of x and y is equal to the valence of the metal.

8. The process of claim 1 wherein the at least one metal carboxylate salt is represented by the formula:

$(R_1CO_2)_2AlOH$ wherein $R_1$ is a hydrocarbyl radical containing from 12 to 30 carbon atoms.

9. The process of claim 1, wherein the at least one metal carboxylate salt comprises an aluminum carboxylate.

10. The process of claim 1, wherein the metal carboxylate salt comprises an aluminum mono-stearate, an aluminum di-stearate, an aluminum tri-stearate, or a combination thereof.

11. The process of claim 1, wherein the liquid vehicle is mineral oil, an aromatic hydrocarbon or an aliphatic hydrocarbon.

12. The process of claim 1 further comprising the step of adding one or more further metal carboxylate salts.

13. The process of claim 1 wherein the at least one fatty amine further comprises a particulate inorganic oxide.

14. The process of claim 13 wherein the particulate inorganic oxide is selected from silica and alumina.

15. The process of claim 1 wherein the at least one metal carboxylate salt and the at least one fatty amine are spray dried or spray congealed.

16. The process of claim 1 comprising the steps of:
   e) spray drying or spray congealing at least one metal carboxylate salt with at least one molten fatty amine; and
   f) adding the spray dried mixture to one or more liquid vehicles.

17. The process of claim 16 further comprising the step of contacting the product of step a) and/or step b) with further metal carboxylate salt.

18. The process of claim 1, wherein contacting at least one metal carboxylate salt with at least one molten fatty amine includes contacting:
   a) 2-20 wt. % of the at least one metal carboxylate salt, with
   b) 2-20 wt. % of the at least one fatty amine, and
   c) at least one liquid vehicle; where the wt. % are based on the total weight percent of a), b) and c).

19. The process of claim 1, wherein contacting at least one metal carboxylate salt with at least one molten fatty amine includes contacting:

a) 3-15 wt. % of the at least one metal carboxylate salt, with
b) 3-15 wt. % of the at least one fatty amine, and
c) at least one liquid vehicle; where the wt. % are based on the total weight percent of a), b) and c).

* * * * *